(12) United States Patent
Choi (10) Patent No.: US 12,459,242 B2
(45) Date of Patent: Nov. 4, 2025

(54) REAL WOOD CRASH PAD AND METHOD OF MANUFACTURING THE SAME

(71) Applicant: HYUNDAI MOBIS Co., Ltd., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 324 days.

(21) Appl. No.: 17/842,165

(22) Filed: Jun. 16, 2022

(65) Prior Publication Data
US 2023/0038584 A1 Feb. 9, 2023

(30) Foreign Application Priority Data
Aug. 4, 2021 (KR) .................. 10-2021-0102377

(51) Int. Cl.
*B32B 21/14* (2006.01)
*B32B 5/02* (2006.01)
(Continued)

(52) U.S. Cl.
CPC .............. *B32B 21/14* (2013.01); *B32B 5/028* (2013.01); *B32B 5/18* (2013.01); *B32B 5/245* (2013.01); *B32B 7/12* (2013.01); *B32B 21/10* (2013.01); *B32B 37/12* (2013.01); *B32B 2266/025* (2013.01); *B32B 2305/022* (2013.01); *B32B 2305/08* (2013.01); *B32B 2307/732* (2013.01);
(Continued)

(58) Field of Classification Search
CPC ........... B32B 21/14; B32B 5/028; B32B 5/18; B32B 5/245; B32B 7/12; B32B 21/10; B32B 37/12; B32B 2266/025; B32B 2305/022; B32B 2305/08; B32B 2307/732; B32B 2317/16; B32B 2605/003; B32B 2262/0253; B32B 2307/51; B32B 5/02; B32B 7/06; B32B 2266/0278; B32B 2605/08; B32B 21/047; Y10T 442/10

See application file for complete search history.

(56) References Cited

U.S. PATENT DOCUMENTS 3,556,448 A * 1/1971 Dobbs ................ B65D 19/0002
428/318.6
5,429,337 A * 7/1995 Poole ................ A47B 21/0314
248/442.2
(Continued)

FOREIGN PATENT DOCUMENTS

DE 4120897 A1 * 1/1992 ............. B32B 21/08
GB 1187681 A * 4/1970 ................ B44F 9/02
KR 10-2020-0042116 A 4/2020

OTHER PUBLICATIONS

Machine Translation DE4120897 (Year: 1992).*

*Primary Examiner* — Jennifer A Steele
(74) *Attorney, Agent, or Firm* — NSIP Law (57) ABSTRACT

Disclosed is a real wood crash pad that includes a real wood sheet including a wood layer, a mesh layer laminated under the wood layer, the mesh layer being configured to provide reinforcement, and an elastic layer laminated under the mesh layer, the elastic layer being configured to provide elasticity, a filament cross pad provided in an area of a vehicle desk where a real wood layer is to be applied, the filament cross pad being laminated under the elastic layer, and a core mounted on the vehicle desk, wherein the real wood sheet is configured for automatic wrapping.

13 Claims, 5 Drawing Sheets

(51) Int. Cl.
*B32B 5/18* (2006.01)
*B32B 5/24* (2006.01)
*B32B 7/12* (2006.01)
*B32B 21/10* (2006.01)
*B32B 37/12* (2006.01)

(52) U.S. Cl.
CPC ..... *B32B 2317/16* (2013.01); *B32B 2605/003* (2013.01)

(56) References Cited

U.S. PATENT DOCUMENTS

| | | | |
|---|---|---|---|
| 10,500,821 B2 * | 12/2019 | Kim | B32B 27/365 |
| 2002/0136862 A1 * | 9/2002 | Dong | B32B 21/08 |
| | | | 428/479.6 |
| 2003/0124271 A1 * | 7/2003 | Michael | B60R 13/0243 |
| | | | 428/31 |
| 2014/0077518 A1 * | 3/2014 | Preisler | B32B 21/14 |
| | | | 296/37.5 |
| 2014/0183892 A1 * | 7/2014 | Beau | B60R 13/0262 |
| | | | 156/196 |
| 2015/0165732 A1 * | 6/2015 | Lee | B32B 21/10 |
| | | | 156/243 |
| 2018/0183265 A1 * | 6/2018 | Byrne | H02J 7/0013 |
| 2022/0032577 A1 * | 2/2022 | Begg | B29C 51/421 |

* cited by examiner

REAL WOOD CRASH PAD AND METHOD OF MANUFACTURING THE SAME

CROSS-REFERENCE TO RELATED APPLICATIONS

This application claims the benefit under 35 USC § 119(a) of Korean Patent Application No. 10-2021-0102377, filed on Aug. 4, 2021, in the Korean Intellectual Property Office, the entire disclosure of which is incorporated herein by reference for all purposes.

BACKGROUND

1. Field

The present disclosure relates to a real wood skin capable of automatic wrapping, and a process and apparatus for manufacturing the same.

2. Description of Related Art

A conventional real wood skin used for vehicles is produced by preforming a real wood sheet on decorative veneer wood, performing insert injection (rear injection) molding on the preformed real wood sheet, trimming the end of the injected real wood sheet, and then curling and coating the trimmed real wood sheet in this order.

Such a conventional real wood skin product may provide a real wood surface with excellent visual and tactile sense due to rear injection molding applied thereto, but feels cheep when pressed by consumers since it comprises high-hardness real wood attached on the injected surface thereof.

Of course, some customers may assume that the skin product is hard due to high-hardness real wood. However, this product may not satisfy customers who want the interior material thereof to be soft.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a real wood crash pad including a real wood sheet including a wood layer, a mesh layer laminated under the wood layer, the mesh layer being configured to provide reinforcement, and an elastic layer laminated under the mesh layer, the elastic layer being configured to provide elasticity, a filament cross pad provided in an area of a vehicle desk where a real wood layer is to be applied, the filament cross pad being laminated under the elastic layer, and a core mounted on the vehicle desk, wherein the real wood sheet is configured for automatic wrapping.

The real wood crash pad may include a protective film laminated on the wood layer, the protective film being configured to protect the wood layer, and the protective film being configured to be removed after processing.

The wood layer may have a thickness of 0.1 t to 0.2 t.

The mesh layer may have a thickness of 0.2 t.

The elastic layer may be formed of polypropylene (PP) foam or thermoplastic polyolefin (TPO) foam.

The elastic layer may have a thickness of 1 t to 2 t.

The protective film may have a thickness of 0.1 t.

The filament cross pad may have a thickness of 2 to 5 t. That is, "t" is a relative measurement.

The filament cross pad may be applied to an area of 3 mm or less from an injected end of the real wood sheet, which is configured to be touched by a hand.

The filament cross pad may be either a PP pad or a TPO pad.

The core may have a thickness of 0.3 t.

The wood grains may be formed on the wood layer by a sanding machine.

The wood layer may be configured to give the same visual impression as wood.

In another general aspect, here is provided a method of manufacturing real wood crash pads, including applying a glue following application of a primer to a core, attaching a filament cross pad to the core using the glue, applying a glue to the top of the filament cross pad, and compressing a real wood sheet, which comprises a mesh layer, a wood layer, and a protective film, to the filament cross pad.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving them will become apparent with reference to the embodiments described below in detail in conjunction with the accompanying drawings. The present disclosure may, however, be embodied in different forms, and should not be construed as being limited to the embodiments set forth herein. Rather, these embodiments are provided so that the disclosure will be thorough and complete, and will fully convey the scope of the present disclosure to those skilled in the art. The present disclosure should be defined based on the entire content set forth in the appended claims. Meanwhile, the terms used herein are for the purpose of describing the embodiments and are not intended to limit the disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
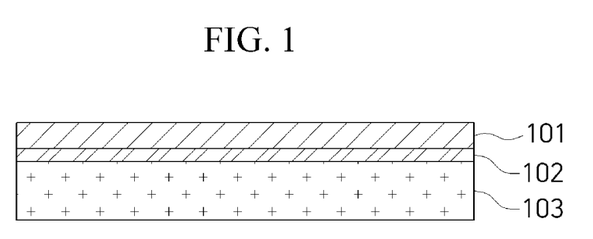
FIG. 1 is a reference view for explaining a real wood skin capable of automatic wrapping according to the present disclosure.

FIG. 1 is a reference view for explaining a real wood skin capable of automatic wrapping according to the present disclosure.

As illustrated in FIG. 1, the real wood skin capable of automatic wrapping according to the first embodiment of the present disclosure includes a wood layer 101, a mesh layer 102, and an elastic layer 103.

The wood layer 101 is a layer that gives the same visual impression as wood material. The wood layer 101 preferably has a thickness of 0.1 t to 0.2 t, and may have wood grain formed by a sanding machine.

The mesh layer 102 is a layer that is laminated under the wood layer 101 to reinforce the sheet. It is preferable that the mesh layer 102 have a thickness of 0.2 t.

The elastic layer 103 is a layer that is laminated under the mesh layer 102 to provide elasticity. The elastic layer 103 may be formed of polypropylene (PP) foam or thermoplastic polyolefin (TPO) foam. It is preferable that the elastic layer 103 have a thickness of 1 t to 2 t.

According to the first embodiment of the present disclosure, the real wood skin may further include a protective film 104 laminated on the wood layer 101 to protect the wood layer. It is preferable that the protective film 104 have a thickness of 0.1 t.

FIGS. 2A to 2E are reference views for explaining a process of manufacturing a real wood sheet according to an embodiment of the present disclosure.

Figure 2A:
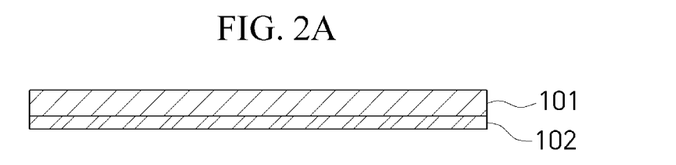
FIGS. 2A to 2E are reference views for explaining a process of manufacturing vehicle crash pads comprising real wood sheets according to an embodiment of the present disclosure.
Figure 2B:
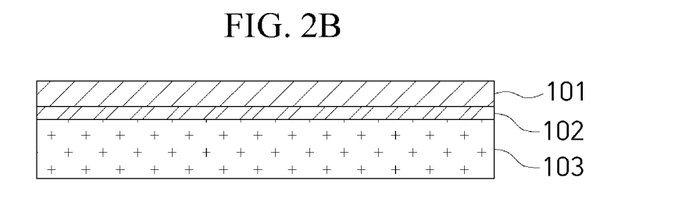
Figure 2C:
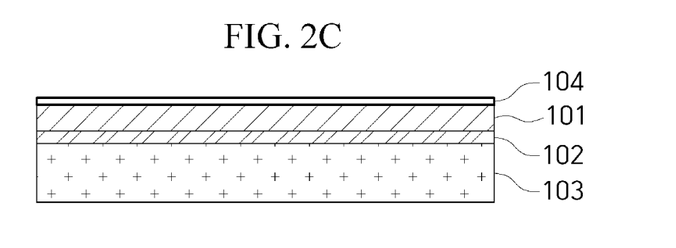
Figure 2D:
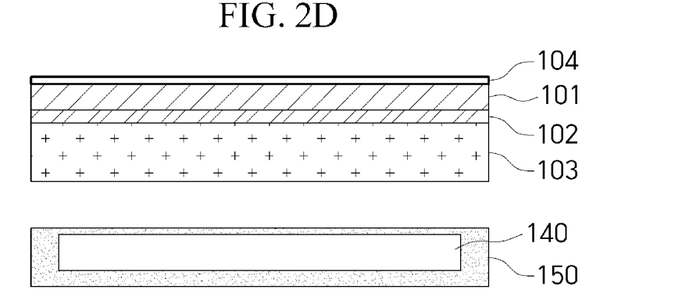

In the real wood sheet of the first embodiment of the present disclosure, the mash layer 102 is laminated under the wood layer 101 as illustrated in FIG. 2A, and the elastic layer 103 is then laminated under the mash layer 102 as illustrated in FIG. 2B. As illustrated in FIG. 2C, the protective film 104 may be laminated on the wood layer 101 to protect the wood layer 101.

Figure 2E:
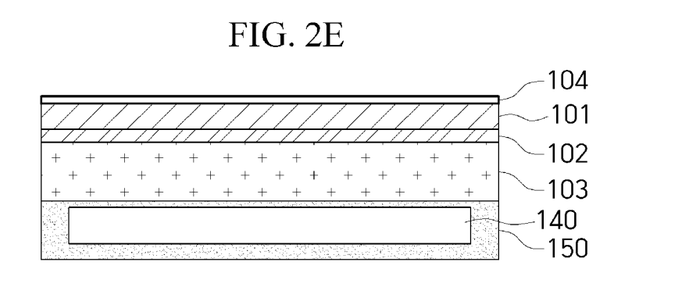

As illustrated n FIG. 2E, the real wood sheet 100, which includes the wood layer 101, the mesh layer 102, and the elastic layer 103, further includes a filament cross pad 140 and a core 150 provided at the bottom thereof.

The filament cross pad 140 is provided in a partial area of a vehicle desk to allow that area to be cushioned.

Figure 3:
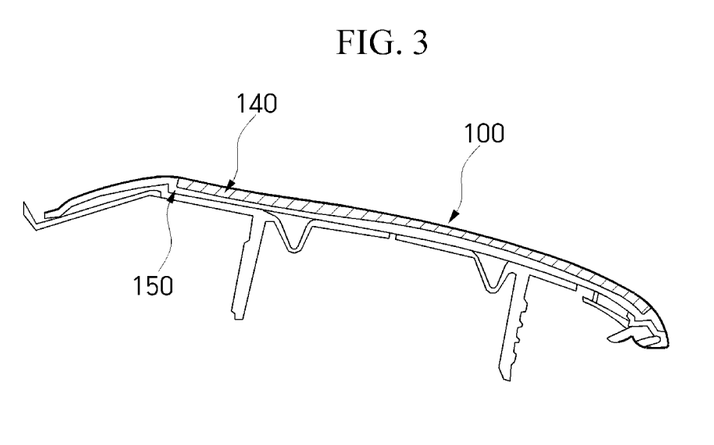
FIG. 3 is a reference view for explaining an example of application of a filament cross pad in an embodiment of the present disclosure.

As such, the filament cross pad 140 provided in one area of the desk is laminated under the elastic layer 103. Here, it is preferable that the filament cross pad 140 have a thickness of 2 to 5 t. In this case, as illustrated in FIG. 3, the filament cross pad 140 is applied to an entire area of 3 mm or less from the injected end of the real wood sheet, which is touched by a hand. The filament cross pad 140 may be made of, but not limited to, PP or TPO material.

The core 150 is mounted on the vehicle desk, and preferably has a thickness of 0.3 t.

Figure 5:
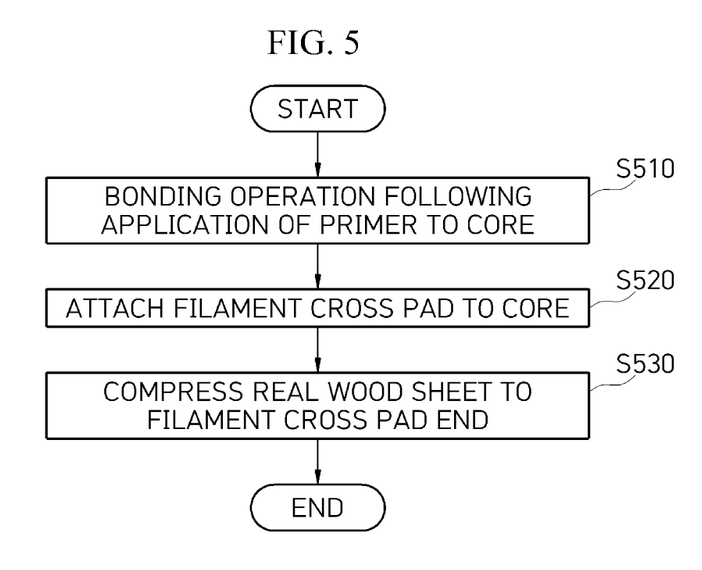
FIG. 5 is a flowchart for explaining a method of manufacturing real wood crash pads according to an embodiment of the present disclosure.

FIG. 5 is a flowchart for explaining a method of manufacturing real wood crash pads according to an embodiment of the present disclosure.

As illustrated in FIG. 5, a bonding operation of applying a glue following a primer to a core 150 is performed (S510). Next, a filament cross pad 140 is attached to the core 150 (S520). This may be made by a membrane or press compression process.

That is, after an additional bonding operation of applying a glue to the top of the filament cross pad 140 is performed, a real wood sheet 100, which includes a wood layer 101, a mesh layer 102, and an elastic layer 103 is compressed with a compression jig (S530).

Figure 4:
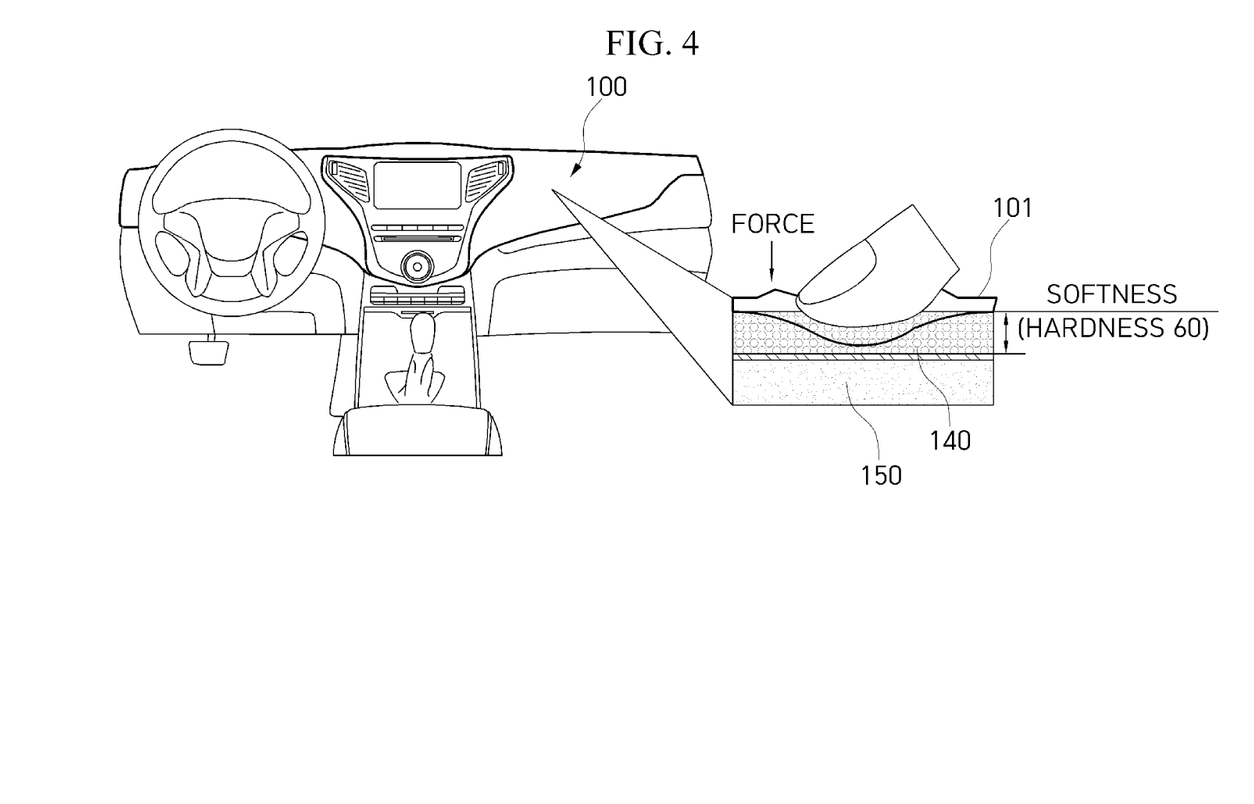
FIG. 4 is a reference view for explaining an example of installation of a vehicle crash pad comprising real wood sheets according to an embodiment of the present disclosure.

As such, it is possible to make the real wood sheet 100, constituting the vehicle desk, visually feel the same as real wood, and to provide a certain degree of cushioning when the real wood sheet is touched by an occupant as illustrated in FIG. 4. As illustrated in at least FIG. 4, the real wood sheet 100 (constituting the vehicle desk) may be disposed on the dashboard of the vehicle.

In the conventional case of manufacturing a real wood sheet through injection molding, it is impossible to implement the effect of the present disclosure. However, according to the first embodiment of the present disclosure, it is possible to supplement the elongation of the real wood sheet and improve the surface quality of the real wood sheet by applying PP foam/TPO foam to the rear surface of the wood, and to make a real wood wrapping product to be soft by applying the filament cross pad used for existing natural or artificial leather to the core.

As is apparent from the above description, according to the first embodiment of the present disclosure, it is possible to make the real wood sheet, constituting the vehicle desk, visually feel the same as real wood, and to provide a, certain degree of cushioning when the real wood sheet is touched by an occupant.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Various embodiments are directed to a real wood crash pad that can provide elasticity while giving a visual impression like real wood.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A real wood crash pad comprising:
   a sheet comprising:
      a wood layer comprising wood, wherein the wood is real wood or veneer wood;
      a mesh layer including an upper surface laminated to the wood layer, the mesh layer configured to provide reinforcement for the wood layer; and
      an elastic layer including an upper surface laminated to a lower surface of the mesh layer, the elastic layer configured to provide elasticity for the wood layer and the mesh layer, wherein the elastic layer comprises polypropylene (PP) foam or thermoplastic polyolefin (TPO) foam, wherein the sheet further comprises a filament cross pad and a core, wherein the filament cross pad comprises either a polypropylene (PP) pad or a thermoplastic polyolefin (TPO) pad and is positioned between the core and the elastic layer, wherein the sheet is compressed to the filament cross pad, wherein the real wood crash pad is
   configured to be placed in an area of a vehicle desk configured with the core mounted on the vehicle desk, wherein the sheet is configured to cushion the vehicle desk area, and wherein the wood layer provides a degree of cushioning when touched.

2. The real wood crash pad according to claim 1, further comprising:
   a protective film laminated on the wood layer,
   wherein the protective film is configured to protect the wood layer, and
   wherein the protective film is further configured to be removed after processing.

3. The real wood crash pad according to claim 2, wherein the thickness of the wood layer is the thickness of the protective film to twice the thickness of the protective film.

4. The real wood crash pad according to claim 2, wherein the thickness of the mesh layer is twice the thickness of the protective film.

5. The real wood crash pad according to claim 2, wherein the thickness of the elastic layer is ten to twenty times the thickness of the protective film.

6. The real wood crash pad according to claim 2, wherein the thickness of the protective film is the same as the thickness of the protective film.

7. The real wood crash pad according to claim 1, wherein the thickness of the filament cross pad is twenty to fifty times the thickness of the protective film.

8. The real wood crash pad according to claim 7, wherein the filament cross pad is applied to an area of 3 mm or less from an injected end of the sheet, the sheet being exposed for contact by a user.

9. The real wood crash pad according to claim 7, wherein the thickness of the core is three times the thickness of the protective film.

10. The real wood crash pad according to claim 1, wherein wood grains are formed on the wood layer by a sanding machine.

11. The real wood crash pad according to claim 1, wherein the wood layer comprises real wood or a decorative veneer wood.

12. A method of manufacturing a real wood crash pad, the method comprising:
- applying a primer to a core;
- applying a glue to the core following the application of the primer to the core;
- attaching a filament cross pad to the core using the glue;
- applying the glue to a top surface of the filament cross pad; and
- compressing a sheet to the filament cross pad,
- wherein the sheet comprises a wood layer comprising wood, wherein the wood is natural wood or veneer wood; a mesh layer configured to provide reinforcement for the wood layer; an elastic layer configured to provide elasticity for the wood layer and the mesh layer, and a protective film configured to protect the wood layer, wherein the elastic layer comprises polypropylene (PP) foam or thermoplastic polyolefin (TPO) foam, wherein the sheet further comprises a filament cross pad and a core, wherein the filament cross pad comprises wither a polyproplyene (P) pad or a thermoplastic polyolefin (TPO) pad and is positioned between the core and the elastic layer, wherein the sheet is compressed to the filament cross pad,
- wherein the real wood crash pad is configured to be placed in an area of a vehicle desk configured with the core mounted on the vehicle desk, wherein the sheet is configured to cushion the vehicle desk area, and wherein the wood layer provides a degree of cushioning when touched. elastic layer comprises polypropylene (PP) foam or thermoplastic polyolefin (TPO) foam, wherein the sheet further comprises a filament cross pad and a core, wherein the filament cross pad comprises either a polypropylene (PP) pad or a thermoplastic polyolefin (TPO) pad and is positioned between the core and the elastic layer, wherein the sheet is compressed to the filament cross pad,
- wherein the real wood crash pad is configured to be placed in an area of a vehicle desk configured with the core mounted on the vehicle desk, wherein the sheet is configured to cushion the vehicle desk area, and wherein the wood layer provides a degree of cushioning when touched.

13. The real wood crash pad according to claim 1, wherein the sheet is configured for automatic wrapping wherein the sheet is configured to cushion the vehicle desk area, and wherein the wood layer provides a degree of cushioning when touched.

* * * * *